(No Model.)
L. J. PAINTER.
SAUCEPAN.
No. 532,901. Patented Jan. 22, 1895.
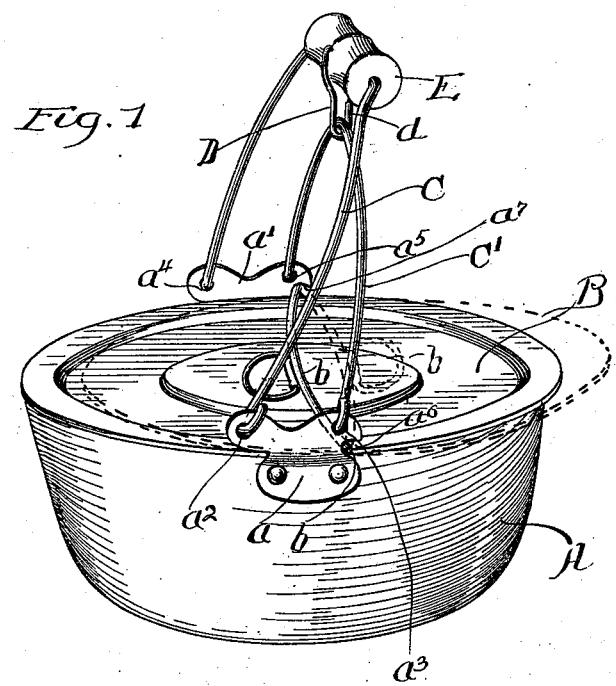
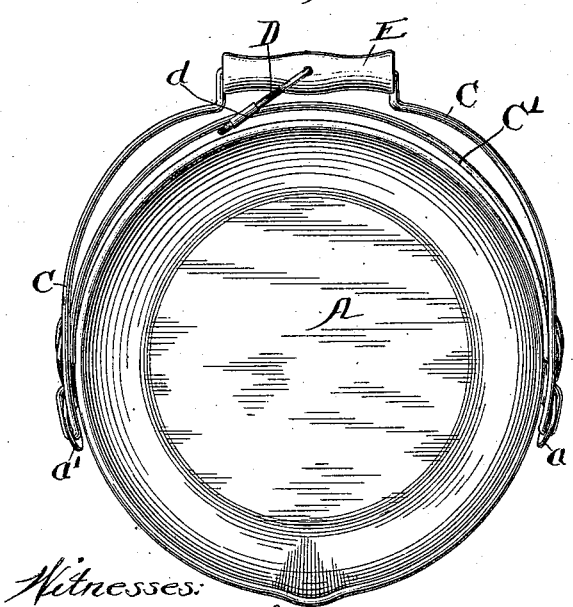
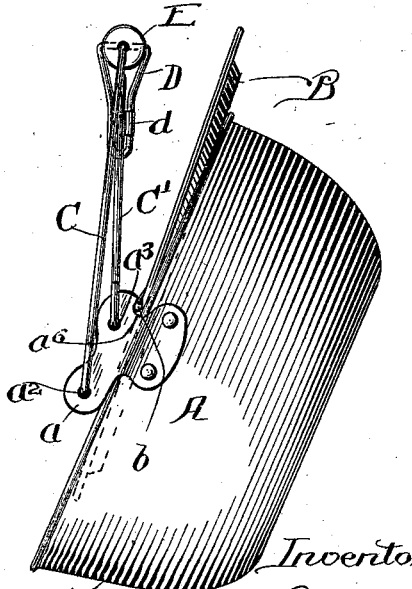
Witnesses:
Charles Hervey
A. H. Ebbs
Inventor:
Ludovic J. Painter
by Miles Werner Bitner
Atty.

UNITED STATES PATENT OFFICE.

LUDOVIC J. PAINTER, OF CHICAGO, ILLINOIS.

SAUCEPAN.

SPECIFICATION forming part of Letters Patent No. 532,901, dated January 22, 1895.

Application filed April 2, 1894. Serial No. 506,042. (No model.)

*To all whom it may concern:*

Be it known that I, LUDOVIC J. PAINTER, a citizen of the United States of America, residing at Chicago, in the county of Cook and State of Illinois, have invented certain new and useful Improvements in Saucepans, of which the following is a specification.

My invention relates to certain improvements upon a class of saucepans, or kettles, which was first invented by R. B. Vanderburg, and patented in Patent No. 513,221, dated January 23, 1894.

The purpose of my improvements is, first, to do away with certain difficulties in the packing or nesting of saucepans of that class, and, second, to cheapen and simplify the entire construction.

To such end my invention consists in certain features of construction which will be fully described below and the essential features of which will be pointed out in the appended claims.

In the drawings furnished herewith, Figure 1 is a side perspective of a saucepan showing my improvements in their preferred form. Fig. 2 is a plan of the same with the cover removed, and Fig. 3 is a side elevation showing the pan in a different position from that seen in Fig. 1.

The body of the pan is lettered A, and the cover B. Upon the body are secured oppositely arranged ears, $a, a'$, each having two holes a slight distance apart and lettered $a^2, a^3, a^4, a^5$. In these holes are pivoted two bails, C, C', of unequal length. These two bails are brought closer together when dropped down upon the side of the pan or kettle as seen in Fig. 2, and if the two bails are drawn together by grasping them in the hand, when in the position seen in Fig. 1, the kettle will be thereby tipped or tilted as is shown in Fig. 3. This operation is common to the construction shown in the prior patent above mentioned. To limit the independent motion of the two bails with respect to each other, a link, here shown at D, is provided, which in the former patent consisted of a loop integral with the larger bail and inclosing the smaller. A difficulty was encountered in said prior construction in the fact that this loop necessarily extended inward over the interior of the kettle when the bails were laid down upon the latter in the proper position for shipping, effectually preventing the placing of one kettle inside of another, or of the nesting of the same which is common in transporting them from place to place. To overcome this difficulty I have provided a separate link, D, which is pivoted in a handle, E, upon the bail, C, and embraces the bail, C'. This link is so pivoted as to permit of longitudinal oscillation with respect to the handle, E, so that when the bails are in the position seen in Fig. 2 the link may be swung to one side entirely out of the way as is seen in that figure. The link, D, is here shown as consisting of a piece of wire passing through the handle, E, and having its two ends soldered together in an inclosing sleeve, $d$, so as to make it a practically continuous ring. I do not, however, consider the construction of this link or the manner of pivoting it to one of the bails as essential to my invention broadly considered, the necessary feature being only that it shall prevent the separation of the two bails beyond a predetermined limit and shall also oscillate upon one of said bails so that it may assume a position in which it will not prevent the nesting of the kettles together.

Each of the ears, $a, a'$, is provided at one side with a hook or notch, $a^6, a^7$, and the cover, B, has a single piece of wire, $b$, soldered to it and extending beyond its edges upon opposite sides in position to engage with the notches, $a^6, a^7$, and said notches are arranged some little distance to one side of a diametrical line through the pan so that the cover, B, when turned one way, may extend over the entire top of the kettle, but when turned the other way leaves a considerable portion adjacent to the nose thereof uncovered to permit of the pouring off of water from the kettle without allowing the contents of the latter to escape.

The wire, $b$, differs from the cover-holding device contained in the patent to Vanderburg above mentioned in that the ends of the wire, $b$, rest normally upon the edges of the cover and extend outward therefrom in position to engage with the notches, $a^6, a^7$, when the cover is crowded in place. In the Vanderburg device the ends of the wire were controlled by spring-portions which normally raise the ends so that they have to be pressed downward to engage them with the ears. This necessitates taking hold of both ends of the wire which requires the use of both hands, whereas in the present device the cover can be crowded into place by one hand and the ends of the wire, $b$, will engage automatically with the notches in the ears.

I claim as new and desire to secure by Letters Patent—

1. The combination with the pan, A, having the two bails, C, C', of an oscillating link, D, pivoted upon one of said bails and embracing the other; substantially as described.

2. The combination with the pan, A, having the two bails, C, C', of the handle, E, upon one of the bails and the link, D, embracing the other bail and pivoted upon the handle so as to oscillate longitudinally thereof; substantially as described.

LUDOVIC J. PAINTER.

Witnesses:
MELVIN C. HERMAN,
CHARLES O. SHERVEY.